March 6, 1928.
G. F. FISHER
1,661,888
METHOD OF AND MEANS FOR CONTINUOUSLY VULCANIZING RUBBER STOCK
Filed Aug. 18, 1926
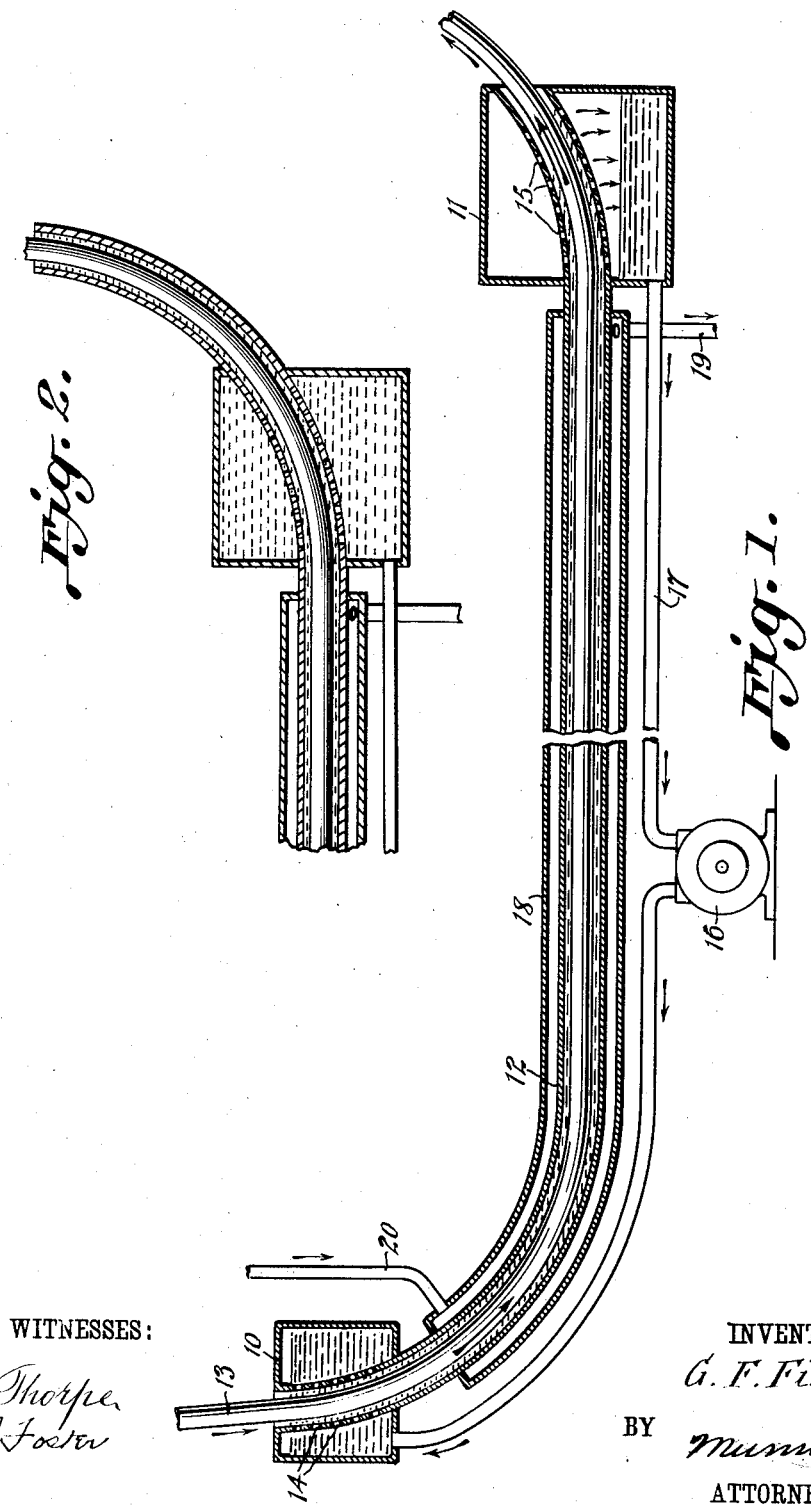
WITNESSES:
Edw. Thorpe
F. J. Foster
INVENTOR:
G. F. Fisher
BY
Munn & Co.
ATTORNEYS.

Patented Mar. 6, 1928.

1,661,888

UNITED STATES PATENT OFFICE.

GEORGE FREDERICK FISHER, OF ROSELLE, NEW JERSEY.

METHOD OF AND MEANS FOR CONTINUOUSLY VULCANIZING RUBBER STOCK.

Application filed August 18, 1926. Serial No. 130,018.

The present invention is concerned with the provision of a novel method of, and means for vulcanizing a continuous length of rubber stock as it comes from the extruding machine, hose building machine, or other preliminary forming machine.

The ordinary method of vulcanizing rubber tube stock, is to cut off suitable lengths of the uncured rubber as it comes from the machine, and place these lengths in large vulcanizing tanks. Great care must be taken to prevent the lengths of uncured stocks from sticking to each other during the vulcanizing process. This method is not only expensive, but requires considerable care in order that each batch of stock may be similarly treated.

In accordance with the present invention, I take the stock directly as it comes from the extruding machine, or other preliminary forming press, and pass it through a curing or vulcanizing chamber, the rate of passage through the chamber being determined by the rate of extrusion, or if desired, a long length of stock may be allowed to collect at the extruding machine and then run through the vulcanizing apparatus of the present invention.

In a preferred embodiment of the invention the stock is actually washed through a vulcanizing chamber, and the liquid which is used to wash or carry the stock through the chamber acts in a dual capacity, both as a heat transfer medium and as a carrier. If the stock is of less specific gravity than the carrier, it will actually be floated through the chamber.

More general objects of the invention are to provide a method and apparatus which will greatly simplify the vulcanizing process, and an apparatus which may be installed and operated with comparative economy.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a broken view in longitudinal section through the apparatus of the present invention.

Fig. 2 is a section showing modified type of ends used on the vulcanizing apparatus of Fig. 1 to provide a liquid pressure head.

In the drawings I have shown a pair of tanks 10 and 11 connected by a pipe 12 of greater cross sectional area than the tube stock 13 which it is proposed to vulcanize. It will be noted that the pipe 12 is open ended, its upper end being located within the tank 10 and the portion of the pipe which is disposed within the tank being perforated as at 14. The lower end of the pipe 12 which is disposed within the tank 11 is also perforated as at 15. The stock 13 enters the open upper end of the pipe 12 passing downwardly through the tank 10 and pipe 12 and upwardly and outwardly through the tank 11.

The two tanks 10 and 11 and the pipe 12 form part of a closed liquid-circulating system. Liquid from the tank 10 flows through the apertures 14 down the pipe 12 and out through the apertures 15 into the tank 11. A pump 16 in return pipe line 17 forces the liquid back into the tank 10 and the liquid circulation is repeated.

The major portion of the pipe 12 between the tanks 10 and 11 is jacketed at 18, numerals 20 and 19 representing inlet and outlet pipe from the jacket through which steam or hot oil are supplied to, and removed from the jacket.

The liquid which is used in the closed circulating system is preferably some material which will be liquid at vulcanizing temperatures without boiling. Roughly, the vulcanizing temperatures may be anywhere from 212° to 400° F., and the liquid may comprise glycerine or low melting point metal in a molten state or other suitable material.

As the open end of the tube stock passes into the upper end of the pipe 12 and down into the liquid, the tube stock will be filled with liquid, or at least that portion of the stock which is disposed in the pipe 12 between the two tanks will be filled with liquid, so that the rubber tubing is subjected to the action of the liquid, both from the interior and the exterior. The forced circulation of liquid caused by the pump 16 is sufficiently strong, so that surface friction is exerted on the tubing to carry the same through the pipe 12. The steam jacket 18 keeps all of the liquid in the circulating system at vulcanizing temperature, so that the liquid acts in the double capacity of a carrier for the stock and a heat transfer agent between the stock and the steam jacket.

The rate at which the stock is carried through the pipe 12 is preferably the same as the rate at which the uncured stock is extruded from the machine. If this extrusion is rapid, and the rate of feed through the pipe is rapid, the vulcanizing chamber will necessarily be somewhat longer. The four factors of rate of feed, length of chamber, temperature of vulcanizing agent, and speed of the pump may be readily regulated however, to take care of stock moving at practically any speed.

For the sake of convenience of description I have illustrated and described the apparatus and the method as applied to the treatment of tube stock. Quite obviously however, the method may be applied with equal facility to rod stock, strip stock, or other rubber products which are continuously extruded from an extruding machine, or which are customarily manufactured in long lengths.

Obviously, various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

Obviously the ends of the pipe 12 might be extended upwardly to give any desired head of liquid if the liquid in the vulcanizing chamber is to be maintained under pressure during the vulcanizing process.

I claim:

1. A method of continuously vulcanizing rubber stock which includes the step of carrying the stock in a moving liquid stream through a vulcanizing chamber and applying heat to the liquid which carries the stock through the chamber.

2. A method of continuously curing rubber stock which consists in maintaining through an open ended vulcanizing chamber a continuous circulation of a liquid which does not boil at vulcanizing temperatures and passing the stock to be cured through the chamber by the surface friction of the liquid.

3. A method of vulcanizing a continuous length of uncured rubber stock which consists in maintaining a continuous circulation of hot liquid through a vulcanizing chamber and using the liquid as a carrying agent to pass the stock through said chamber.

4. A method of vulcanizing which includes the step of using a hot recirculated liquid to carry a continuous length of stock through a vulcanizing chamber.

5. A method of vulcanizing which includes the step of floating a continuous length of uncured stock through an open ended liquid filled steam jacketed vulcanizing chamber.

6. Apparatus for continuously vulcanizing rubber stock, including a steam jacketed open ended hot chamber through which the uncured stock is adapted to be passed, and means for maintaining a continuous flow of heat-transmitting and stock-carrying liquid through the chamber.

7. Apparatus for continuously vulcanizing rubber stock, including a steam jacketed open ended hot chamber through which the uncured stock is adapted to be passed, and means for maintaining a continuous flow of heat-transmitting and stock-carrying liquid through the chamber, said chamber forming part of a liquid circulating system with which it communicates through openings near its ends.

8. Apparatus for continuously vulcanizing rubber stock, including a steam jacketed open ended hot chamber through which the uncured stock is adapted to be passed, and means for maintaining a continuous flow of heat-transmitting and stock-carrying liquid through the chamber, said chamber forming part of a liquid circulating system with which it communicates through openings near its ends, said system including a pair of tanks in which the open and apertured ends of the chamber are mounted, and a pump for passing liquid from one tank to the other.

9. Apparatus as set forth in claim 8, wherein the flow of the liquid from one chamber to the other is gravitational.

10. A method of continuously vulcanizing rubber uncured stock, which includes the step of carrying the stock through a liquid filled open ended, steam jacketed vulcanizing chamber and applying heat to the liquid in the chamber.

11. Apparatus for continuously vulcanizing rubber stock including a steam jacketed, liquid filled open ended hot chamber through which the uncured stock is adapted to be passed.

12. Apparatus for continuously vulcanizing rubber stock including a steam jacketed open ended liquid filled hot chamber through which uncured stock is adapted to be passed, the ends of said chamber being arranged above the intermediate portion thereof, whereby the head of liquid in the ends of the chamber causes a pressure in the intermediate portion of the chamber.

13. A method as set forth in claim 3, wherein the hot liquid is maintained at pressures and temperatures prohibitive of ebullition.

GEORGE FREDERICK FISHER.